United States Patent

Roitberg et al.

[11] Patent Number: 5,958,479
[45] Date of Patent: Sep. 28, 1999

[54] ANTIOXIDANT/DESICCANT PACKET AND METHOD FOR USE THEREOF

[75] Inventors: Michael Roitberg, Highland Park, N.J.; Mel Blum, Wantagh, N.Y.

[73] Assignee: American Roland Chemical Corporation, Farmingdale, N.Y.

[21] Appl. No.: 09/056,523

[22] Filed: Apr. 7, 1998

Related U.S. Application Data

[63] Continuation-in-part of application No. 08/635,087, Apr. 19, 1996, abandoned.

[51] Int. Cl.$^6$ ........................................... B65B 29/02
[52] U.S. Cl. ........................ 426/84; 426/133; 426/541; 426/544; 426/545; 426/546; 426/547; 426/398; 502/515; 502/407
[58] Field of Search ........................... 426/84, 133, 541, 426/544, 545, 546, 547, 398; 252/194; 502/515, 407; 428/545

[56] References Cited

U.S. PATENT DOCUMENTS

| | | | |
|---|---|---|---|
| 4,113,652 | 9/1978 | Yoshikawa et al. | 252/428 |
| 4,861,632 | 8/1989 | Caggiano | 428/35.2 |
| 5,064,698 | 11/1991 | Courtright et al. | 428/35.4 |
| 5,102,673 | 4/1992 | Sugihara et al. | 426/124 |
| 5,124,164 | 6/1992 | Matsumoto et al. | 426/398 |
| 5,143,769 | 9/1992 | Moriya et al. | 428/76 |
| 5,422,187 | 6/1995 | Miksic et al. | 428/545 |
| 5,591,504 | 1/1997 | Lieberman | 428/68 |

FOREIGN PATENT DOCUMENTS 53-139741  12/1978  Japan .

Primary Examiner—Nina Bhat
Attorney, Agent, or Firm—Jordan and Hamburg LLP

[57] ABSTRACT

An antioxidant composition which utilizes a desiccant carrier impregnated with a suitable fat soluble antioxidant is conveniently contained within a vapor permeable housing to prevent homogeneous mixing thereof with a stored product when the composition is provided in granulated form. The desiccant carrier is selected from a group of suitable hydrophilic materials which demonstrates the capacity for reducing levels of atmospheric moisture by absorption thereof, including for example, silica gel. The housing may conveniently be a sealed packet formed from a porous fiber material, such as, for example, that commonly used for fashioning tea bags and the like. Alternatively, the housing may include an enclosed perforated structure, the perforations of which are smaller than the granules of the contained composition. Where the composition is provided in the form of a unitary body, a housing need not be used. The antioxidant composition is prepared by impregnating the selected desiccant with an oil soluble antioxidant, which includes for example, such compounds as ethoxyquin, ascorbyl palmitate, stearate or oleate, propyl gallate and other gallate esters, BHA (butylated hydroxy anisole), BHT (butylated hydroxy toluene), tocopherols and salts thereof (either natural or synthetic), TBHQ (tertiary butyl hydro quinone), etc. The composition, when placed in a closed atmosphere with the stored product, absorbs any moisture present therein, and releases antioxidant in vaporized form into the ambient atmosphere, which then permeates throughout the stored product.

26 Claims, 1 Drawing Sheet

ANTIOXIDANT/DESICCANT PACKET AND METHOD FOR USE THEREOF

REFERENCE TO RELATED APPLICATION

This is a continuation-in-part of application Ser. No. 08/635,087, filed Apr. 19, 1996, now abandon.

BACKGROUND OF THE INVENTION

The present invention relates to stabilization of food products against rancidity and moisture spoilage, and more particularly to an article and method for inhibitinig oxidation and for reducing the moisture content of packaged products prone to such spoilage.

Low moisture products are typically packaged and stored in containers in which air is present. Oxygen present within the product itself or in the surrounding air can contribute, in varying degrees, to the degradation of the stored product. Of these products, foods containing a significant proportion of oils high in poly- or mono-unsaturated fatty acids are particularly subject to spoilage, since the multiple double bonds present in such oils are readily oxidized. The rate of oxidation is even greater for oils in the refined state and for foods lacking a coat providing a partial protective barrier, for example nuts removed from the shells and subsequently stored.

The use of antioxidants to preserve foods is known in the art and embraces many suitable compounds capable of slowing the normally occurring rate of oxidation. Used as a food additive incorporated directly in the product or applied to the exterior thereof where homogeneous inclusion is not possible, such compounds slow the natural rate of oxidation of the food product.

Among such antioxidants, ethoxyquin, for example, has been widely used in prolonging shelf-life of various consumable materials, particularly those stored in bulk. Examples of such consumables include materials with a potentially high degree of rancidity such as pecans, peanuts, walnuts, macadamias, pignoli nuts, as well as other items, including dry or prepared cereals and breakfast products, unrefined natural grains, seeds, many health foods, pharmaceuticals, vitamins, dried fruit packages, etc. Although effective as an antioxidant, its use, however, is subject to a variety of drawbacks. In its pure state, under normal ambient conditions, ethoxyquin (6-ethoxy-1,2-dihydro-2,2,4-trimethylquinoline) is a viscous-like oil having a viscosity of approximately 300 cps, for example, at 20° C. This high viscosity makes the even distribution throughout the food product, in typically applied concentrations below 150 ppm, exceedingly difficult, thus introducing the tendency of localized pockets of higher, undesirable concentrations. In addition, ethoxyquin is relatively insoluble in water, rendering its introduction as an aqueous solution impracticable. Suppliers generally recommend that ethoxyquin be premixed with a suitable carrier, such as an oil diluent, prior to spraying on foodstuffs. Alternatively, it has been suggested in the art that the ethoxyquin might be homogeneously distributed effectively throughout the food product by creating an emulsifier-stabilized suspension or by impregnating powderized silica gel with the ethoxyquin, and applying the resultant modified form of antioxidant. However, even when usable to a satisfactory degree in such forms, ethoxyquin remains susceptible to degradation caused by exposure to oxygen, particularly in the presence of light and elevated temperatures. Thus, maintaining continued viability prior to use may make its prolonged storage difficult.

In addition to ethoxyquin, other antioxidants currently available include, for example, ascorbyl palmitate, stearate or oleate, propyl gallate and other gallate esters, BHA (butylated hydroxy anisole), BHT (butylated hydroxy toluene), tocopherols and salts thereof (either natural or synthetic), TBHQ (tertiary butyl hydro quinone), etc., which like ethoxyquin, are fat soluble. Blends of the above listed antioxidants may also be used in combination. Although approved as food additives by the Food and Drug Administration (FDA), there has been an ever increasing public concern regarding introduction of artificial additives, such as the above listed antioxidants as well as ethoxyquin, directly into food. Notwithstanding these health concerns, substantiated or otherwise, limiting the amount of antioxidants applied to the consumable product is important from the standpoint of palatability, since such additives can adversely affect taste and possibly impart an undesirable odor to the food material, particularly as their concentration is increased.

An alternative approach taken in the prior art for reducing oxidation and inhibiting development of rancidity in susceptible foodstuffs, involves the use of oxygen-absorbing compositions which, when included in a sealed container, reduce the product's exposure to oxygen by depleting, consuming, or otherwise reducing the free oxygen contained therein. These so called "oxygen scavengers" are either included as a formed layer, or layers, affixed to the interior of the container, or are packaged in an enclosed vapor-permeable bag or packet which may then be included along with the stored product. Unlike the above described antioxidants which are applied directly to the food, discrete packaging of the oxygen absorbents provides the advantage of preventing direct contact of the compositions with the food products. Several drawbacks, however, relate to the use of these oxygen absorbents. Because of the strong affinity of such compounds for atmospheric oxygen, storage and handling of oxygen absorbents can present problems. In addition, such compositions are generally limited to use with products stored in airtight containers which are not repeatedly opened and resealed, since replenishment of atmospheric oxygen would rapidly deplete the oxygen absorptive properties of the composition.

Accordingly, it is an object of the invention to provide an antioxidant composition in a form, and a method for use of same, which overcomes the drawbacks of the prior art.

It is a further object of the invention to provide an antioxidant composition which may be included within a containerized stored product in a manner which will enhance even distribution throughout the product without creating regions of excessive concentration, and which obviates the introduction of same as a sprayed liquid applied directly to the foodstuffs.

It is a still further object of the invention to provide such antioxidant composition in a form permitting reliable storage over extended periods prior to use without significant loss of chemical viability.

It is yet a further object of the invention to provide an antioxidant composition which reduces the moisture content of the stored product while simultaneously imparting resistance against product degradation, including loss of nutrients and pigmentation, and mold formation.

Still another further object of the invention is to provide an antioxidant composition in a form which is economically produced in an easily handled form which may be added to a storedproduct with a minimum of difficulty.

SUMMARY OF THE INVENTION

Briefly stated, there is provided an antioxidant composition which utilizes a desiccant carrier impregnated with a suitable fat soluble antioxidant, the composition being in a packetized state, conveniently accomplished, for example, by containment within a vapor permeable housing. The desiccant carrier is selected from a group of suitable hydrophilic materials which demonstrates the capacity for reducing levels of atmospheric moisture by absorption thereof. Such compounds include for example, silica gel (silicic acid), activated alumina, bauxite (aluminum silicate), and the like. The desiccant is advantageously provided in granulated form to present enhanced surface area for atmospheric exchange. In such form, the vapor permeable housing prevents direct contact of the stored product with the composition contained therein, while permitting free exchange of vaporized atmospheric components into and out of the housing. Such housing may conveniently be a sealed packet comprised of a synthetic or naturally derived porous fiber material, such as, for example, that commonly used for fashioning tea bags and the like. Alternatively, the housing may include an enclosed perforated structure, the perforations of which are smaller than the granules of the contained composition. Other structures which provide vapor exchange between the ambient atmosphere and the enclosed composition, while preventing distribution of the composition throughout the stored contents, are also acceptable alternatives contemplated within the scope of the invention. The term "packetized" as used herein is inclusive of but not limited to use of a packet, perforated housing or aforementioned other structures.

The antioxidant composition is prepared by impregnating the selected desiccant with an oil soluble antioxidant, which includes for example, such compounds as ethoxyquin, ascorbyl palmitate, stearate or oleate, propyl gallate and other gallate esters, BHA (butylated hydroxy anisole), BHT (butylated hydroxy toluene), tocopherols and salts thereof (either natural or synthetic), TBHQ (tertiary butyl hydro quinone), and the like. The composition, when placed in a closed atmosphere with the stored product, absorbs any moisture present therein, and releases a proportional amount of antioxidant in vaporized form into the ambient atmosphere, which then permeates throughout the stored product. As the product continues to evolve any moisture remaining therein, or as moisture content of the contained atmosphere is replenished by opening and resealing the storage container, additional antioxidant is released in an amount proportional to water absorbed by the desiccant component of the composition.

In an advantageous embodiment, ethoxyquin is selected as the antioxidant, which when impregnated into a granulated silica gel desiccant carrier, comprises, from about 0.05% to about 10% by weight of the resultant composition, with an average range being from about 2% to about 4% by weight of the resultant composition. The composition is packetized within a porous paper or other fibrous material, and the enclosed packet conveniently added, in unsecured manner, among the stored product in a desired weight proportion of antioxidant to stored product.

In an alternative embodiment, the composition is packetized in a perforated rigid housing formed from plastic or other suitable inert material, the perforations of which are sufficiently small as to prevent passage of the solid composition therethrough. The housing is provided with means for fixing same to an interior surface of the stored product container, for example optimally on the upper lid thereof, allowing convenient access thereto should replacement of same be desired. Such attachment means may, for example, comprise the use of a simple adhesive applied to the interior container surface and/or the housing. A more elaborate means for attachment may alternatively comprise, for example, a magnet glued to the antioxidant housing which could then be used to temporarily hold the housing to the interior of a steel lid, for disposition above the stored product. Another alternative means for attachment may include a hook and loop type fastening system in which cooperating elements are carried respectively on each of the housing and the interior of the storage container. Many other suitable means for attachment may also be practiced without departure from the intended scope of the invention.

In further embodiment, the packetized composition may be protected from loss of potency during storage prior to use by containment thereof within a hermetically sealed outer wrap within which is contained an inert atmosphere, for example dry nitrogen. Such outer protective wrap is conveniently a lightweight, inexpensive material, which is easily heat-sealed, such as for example Mylar plastic sheet. Optimaly, such material selected for the outer wrap should possess a relative degree of opacity, to inhibit degradation of the composition caused by exposure to light.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
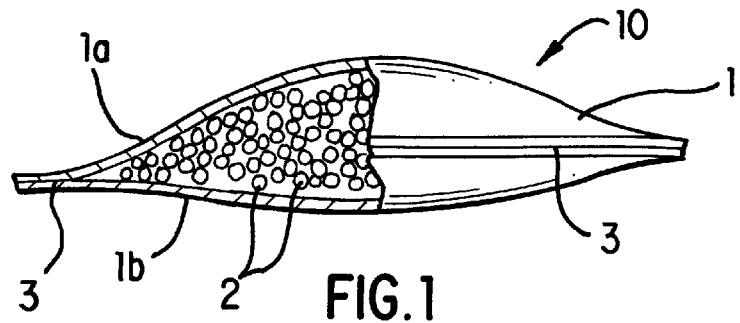
FIG. 1 is a cross-sectional side view of an embodiment in accordance with the present invention, utilizing a packetized porous housing form of enclosed antioxidant composition.

Referring now to FIG. 1, there is shown, generally at 10, a packetized antioxidant in accordance with the invention. In its broadest terms, "packetized antioxidant" is defined for purposes of this disclosure as any form which will prevent dispersal of discrete particulate elements throughout the stored product with which it is included. This will include, for example, an antioxidant composition in a solid contiguous, unitary form, as well as granulated or other particulate form of antioxidant composition retained within a confining structure. In the embodiment depicted in FIG. 1, the packetized structure is conveniently provided in the form of a porous outer packet 1. Outer packet 1 is comprised of a porous, inert, advantageously flexible sheet material, conveniently, for example, a suitable paper fiber material, such as is commonly used for constructing tea bags and the like. A granulated antioxidant composition 2 is disposed within outer packet 1 which is sealed along edges 3 for secure confinement of antioxidant composition 2 therein.

The precise method of manufacture of outer packet 1, and its resultant form, is not critical to the invention and is realizable by those of ordinary skill in the art in view of the present disclosure. For example, outer packet 1 may be formed by sealing the edges of two separate sheets of fiber material 1a and 1b, completely around aligned perimeters thereof, as depicted in FIG. 1, or alternatively by folding a single rectangular sheet at a midsection thereof and sealing the doubled sheet along the three open edges. Any suitable glue approved for use with food products and feed materials may be used to seal outer packet 1, or any other means for sealing, including for example stitching, heat sealing, crimping, etc., may alternatively be employed. Packetized antioxidant 10 may then be added, conveniently in an unsecured manner, amongst the stored product in a desired weight proportion of antioxidant composition 2 to stored product.

Antioxidant composition 2, produced in accordance with the invention broadly comprises a desiccant carrier impregnated with a suitable fat soluble antioxidant. The desiccant carrier is selected from a group of suitable hydrophilic materials which demonstrates the capacity for reducing levels of atmospheric moisture by absorption thereof. Such compounds include for example, silica gel (silicic acid), activated alumina, bauxite (aluminum silicate), etc. The desiccant is advantageously provided in granulated form to present enhanced surface area for atmospheric exchange. However, by providing same in solid, unitary form, a vapor permeable housing need not be used to prevent fractionalized dispersal of solid component portions of the composition throughout the stored material.

Antioxidant composition 2 is prepared by impregnating a selected desiccant with an oil soluble antioxidant, which includes for example, such compounds as ethoxyquin, ascorbyl palmitate, stearate or oleate, propyl gallate and other gallate esters, BHA (butylated hydroxy anisole), BHT (butylated hydroxy toluene), tocopherols and salts thereof (either natural or synthetic), TBHQ (tertiary butyl hydro quinone), and the like. Once impregnated, any excess antioxidant not fully absorbed is preferably removed from a surface of the prepared composition. Production methodologies for various embodiments of antioxidant composition 2 in accordance with the invention will be addressed in greater detail below.

Because the affinity of the antioxidant composition 2 for water is greater than for the oil soluble antioxidant held thereby, the composition demonstrates the capacity to release a proportional amount of antioxidant in vaporized or ionized form into the ambient atmosphere as atmospheric moisture is absorbed by the desiccant component. Therefore, when placed within a closed environment along with a stored product, as the product evolves moisture contained therein, or as moisture content of the contained atmosphere is replenished by opening and resealing the storage container, vaporized antioxidant is released in an amount proportional to water absorbed by the composition. In an advantageous embodiment of antioxidant composition 2, ethoxyquin (6-ethoxy-1,2-dihydro-2,2,4-tritethylquinoline) is selected for use as the oil soluble antioxidant component of antioxidant composition 2, which, when impregnated into a granulated silica gel desiccant carrier comprises about 0.05% to about 10% by weight of the resultant composition, with a mean average range believed to be between about 2% and 4%.

Figure 2:
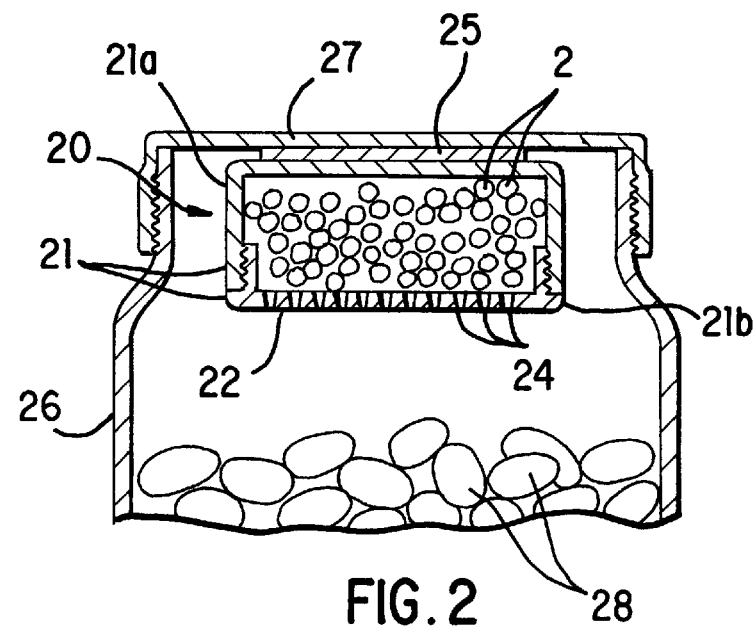
FIG. 2 is a cross-sectional side view of another embodiment, in which a rigid, perforated housing for attachment to a storage container interior is used to contain the antioxidant composition.

Turning now to FIG. 2, another embodiment of a packetized antioxidant in accordance with the invention is shown generally at 20, comprising an alternative outer housing 21 for containment of antioxidant composition 2. Antioxidant composition 2 is prepared according to the guidelines disclosed above, and is advantageously of granulated structure as depicted. Outer housing 21 may be any shape, but is advantageously of generally cylindrical shape as shown. Outer housing 21 includes means for accessing an interior thereof, conveniently provided in the form of a reservoir portion 21a, and a lid portion 22 threadingly engagable therewith. Means are provided for permitting the flow of vapor components across outer housing 21, conveniently in the form of perforations 24 advantageously disposed in lid portion 22, such that when outer housing 21 is oriented as shown, perforations 24 are downwardly disposed. Perforations 24 are sufficiently small to substantially block passage of particulate components of granulated antioxidant composition 2. Means are further provided for mounting outer housing 21 to the interior of a storage vessel 26. In the embodiment as depicted, these means are provided in the form of a magnet 25, which is advantageously of the type comprised of anisotropically charged particles within impregnated flexible rubber, commonly used for refrigerator note magnets and the like. Magnet 25 is fixedly attached to the flat bottom of housing reservoir portion 21a. By using a storage lid 27 containing steel or other ferromagnetic material, magnet 25 permits removable attachment of packetized antioxidant 20 thereto. As water vapor is evolved from a stored product 28, or as moisture content of the contained atmosphere is replenished by opening and resealing storage vessel 26, atmospheric vapor passes through perforations 24 and is absorbed by antioxidant composition 2, and the oil soluble antioxidant component of antioxidant composition 2 is released as vapor in an amount proportional to the water vapor absorbed by antioxidant composition 2, passing through perforations 24 and permeating stored product 28, protecting same from rapid oxidation.

Figure 3:
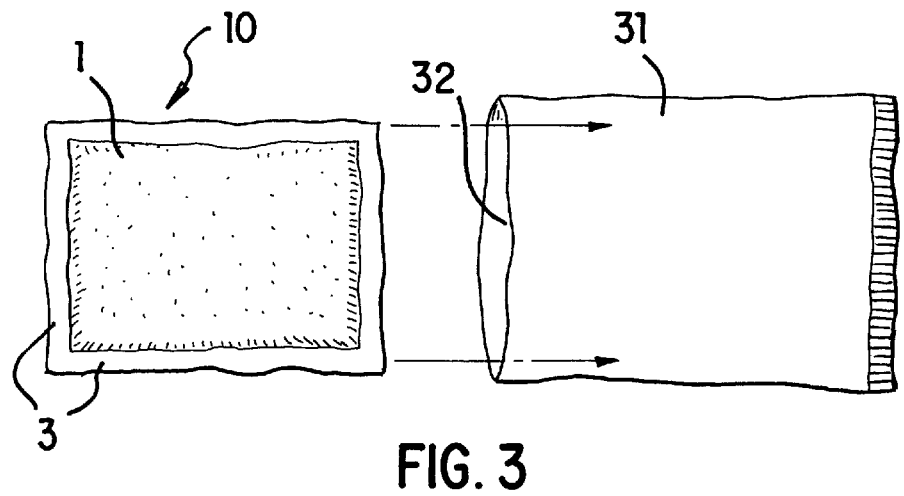
FIG. 3 is a perspective, exploded view of an embodiment in accordance with the invention for prolonging the shelf-life of a packetized antioxidant as depicted in FIG. 1, prior to use thereof.

In another embodiment, the above described packetized or housed composition may be protected from loss of potency during storage prior to use. Referring to FIG. 3, a packetized antioxidant 10 as disclosed with respect to FIG. 1, is received within a protective envelope 31. Protective envelope 31, which is conveniently in the form of a sleeve sealed at one end thereof, is comprised of a non-porous material which permits contents contained therein to be hermetically sealed. The material used for protective envelope 31 is advantageously a lightweight, flexible, relatively inexpensive material, optimally possessing light opaque characteristics. By using thermo-sensitive plastic, such as for example Mylar sheet, protective envelope 31 may be easily heat sealed along open end 32 to achieve the hermetic seal. An atmosphere within protective envelope 32 is limited to an inert gas or gases, such as, for example, dry nitrogen, which when sealed therein, prevents degradation of packetized antioxidant 10 prior to use. Alternatively, packetized antioxidant 10 may be vacuum sealed within protective envelope 32. It is noted that although a packetized antioxidant in accordance with the embodiment as depicted in FIG. 1 has been conveniently selected for disclosure purposes, the above described means for protecting antioxidant composition viability prior to use may be analogously practiced with regard to other packetized structures.

In practice, antioxidant composition 2 may be prepared by various acceptable production methodologies which have been found effective in achieving the goals of the invention as set forth herein. These various methodologies will be described with regard to ethoxyquin as the active antioxidant component of antioxidant composition 2, however it will be understood that the production principles are analogously applicable to any other suitable fat soluble antioxidant embodied within the scope of the invention as claimed. Similarly, although the methods described below are for illustrative purposes directed to silica gel as the desiccant, they are applicable to other similar desiccants suitable for use in accordance with the invention. In addition, it will be understood that mixtures of various antioxidants and/or desiccant carriers may be introduced into the systems outlined below to create possibly more effective antioxidant/desiccant compositions.

To facilitate homogeneous mixing of the ethoxyquin with the silica gel into which it is to be impregnated, a compatible solvent may be advantageously used to dilute the ethoxyquin in order to effectively reduce its naturally high viscosity under ambient conditions. Suitable solvents include for example ethyl alcohol, propylene, glycol, acetone, DMSO (dimethyl sulfoxide), chloroform, ether, ethyl acetate, isopropyl alcohol, butanol, methyl ethyl ketone, and the like. Once diluted the ethoxyquin solution is injected into a batch process fluid bed dryer for blending with granulated silica gel contained therein. The capacity of such a dryer typically ranges from about 500 to about 2,000 gallons, and accommodates approximately 1 kilogram of silica gel per gallon. It is noted that since density of the silica gel varies inversely with particle size, weight capacity of the dryer is greater for silica gel having a finer particle size. As noted above, ethoxyquin levels of the resultant composition vary between about 0.05% to about 10%, by weight with levels of about 2% to about 4% by weight being considered a mean average. An appropriate amount of dissolved ethoxyquin is therefore advantageously introduced into the batch dryer to achieve a level falling within these ranges. The resultant mix of solubilized ethoxyquin and silica gel is thoroughly blended for a sufficient period of time to insure a uniform, homogeneous product, for example, for about 30 to 60 minutes, which has been shown in practice to be of effective duration. During this blending process the solvent is slowly evacuated by gently vacuum drying the mixture.

In accordance with an alternative mixing method in which use of a solvent is omitted, the unadulterated ethoxyquin is made free flowing by heating to a temperature, advantageously in a range from about 60° to about 85° C. The ethoxyquin is then directly injected or pumped into a Glatt, Paterson-Kelly or similar fluid bed tumbling, blending and drying unit. It is noted, however, that because of its viscous nature, the manufacturing process takes longer when ethoxyquin is mixed with the desiccant component in undiluted form.

In addition to the batch processes described above, the antioxidant composition in accordance with the invention may alternatively be prepared by a continuous process, for example, a ribbon blending system. Such system is purged of humidity and advantageously operated under an inert gas cover, such as, for example, nitrogen. A continuous blending operation may typically process two to five times more material per hour depending on its size than any of the aforementioned batch processes, but is thought less effective in maintaining granulometry or homogeneity than fluid bed apparatus.

The above described methods represent examples only of suitable manufacturing processes. Other methods may be practiced without departure from the intended scope of the invention. For example, production can be accomplished by distilling the ethoxyquin directly into the silica gel. In accordance with such a process, the ethoxyquin is vacuum distilled over a bed of silica gel. Requiring greater manufacturing cost, production in accordance with this method is thought however to yield the highest quality end product.

Packaging of the prepared antioxidant composition is advantageously carried out in a dry room, for example one having an atmosphere at not greater than about 5% relative humidity.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A packetized antioxidant, for enhancing preservation of a product stored within a confined atmosphere, comprising:

a vapor permeable confining structure; and a composition confined within said structure, said composition comprising desiccant impregnated with a fat soluble antioxidant, said desiccant possessing a greater affinity for water than for said antioxidant, whereby when said packetized antioxidant is placed with said confined atmosphere, a quantity of said fat soluble antioxidant is released into said confined atmosphere as any moisture present within said confined atmosphere permeates said confining structure and is absorbed by said composition.

2. The packetized antioxidant according to claim 1, wherein said desiccant comprises silicic acid.

3. The packetized antioxidant according to claim 2, wherein said fat soluble antioxidant comprises ethoxyquin.

4. The packetized antioxidant according to claim 3, wherein said ethoxyquin comprises from about 0.05% to about 10% by weight of said composition.

5. The packetized antioxidant according to claim 3, wherein said ethoxyquin comprises from about 2% to about 4% by weight of said composition.

6. The packetized antioxidant according to claim 1, in combination with means for prolonging a shelf-life of said packetized antioxidant prior to use, said means for prolonging comprising:

a protective envelope for captively receiving said packetized antioxidant for confinement therein, said protective envelope being hermetically sealed from an outside atmosphere; and an interior atmosphere of said protective envelope consisting of at least one inert gas.

7. The combination of claim 6, wherein said protective envelope is opaque.

8. The packetized antioxidant according to claim 1, in combination with means for prolonging a shelf-life of said packetized antioxidant prior to use, said means for prolonging comprising:

a protective envelope for captively receiving said packetized antioxidant for confinement therein, said protective envelope being hermetically vacuum sealed from an outside atmosphere.

9. The combination of claim 8, wherein said protective envelope is opaque.

10. A packetized antioxidant, for enhancing preservation of a product stored within a confined atmosphere, comprising:

a composition comprising a desiccant impregnated with a fat soluble antioxidant, said desiccant possessing a greater affinity for water than for said antioxidant, whereby when said packetized antioxidant is placed within said confined atmosphere, a quantity of said antioxidant is released into said confined atmosphere as any moisture present within said confined atmosphere permeates said confining structure and is absorbed by said composition, and said composition being provided in a solid, unitary form defining a structurally cohesive mass.

11. An antioxidant/desiccant combination for preservation of a product stored in a confined atmosphere within a container, comprising:

a solid composition;

means for preventing a fractionalized dispersal of solid component portions of said solid composition at least partially throughout the product stored within the container; and said solid composition comprising a hydrophilic desiccant at least partially impregnated with a fat soluble antioxidant, said desiccant possessing a greater affinity for water than for said antioxidant, whereby when said solid composition is placed within the container along with the stored product, a quantity of said fat soluble antioxidant is released into the confined atmosphere as any moisture present within the container is absorbed by said composition.

12. The antioxidant/desiccant combination according to claim 11, wherein said hydrophilic desiccant includes silicic acid.

13. The antioxidant/desiccant combination according to claim 11, wherein said fat soluble antioxidant includes ethoxyquin.

14. The antioxidant/desiccant combination according to claim 13, wherein said ethoxyquin comprises about 0.05% to about 10% by weight of said composition.

15. The antioxidant/desiccant combination according to claim 13, wherein said ethoxyquin comprises about 2% and 4% by weight of said composition.

16. The antioxidant/desiccant combination according to claim 11, in combination with means for prolonging a shelf-life of the antioxidant/desiccant combination prior to use, said means for prolonging comprising:

a protective envelope for captively receiving said antioxidant/desiccant combination for confinement therein, said protective envelope being hermetically sealed from an outside atmosphere; and an interior atmosphere of said protective envelope consisting of at least one inert gas.

17. The combination of claim 16, wherein said protective envelope is opaque.

18. The antioxidant/desiccant combination according to claim 11, in combination with means for prolonging a shelf-life of the antioxidant/desiccant combination prior to use, said means for prolonging comprising:

a protective envelope for captively receiving said antioxidant/desiccant combination for confinement therein, said protective envelope being hermetically vacuum sealed from an outside atmosphere.

19. The combination of claim 18, wherein said protective envelope is opaque.

20. An antioxidant/desiccant combination for preservation of a product stored in a confined atmosphere within a container, comprising:

a composition which comprises a hydrophilic desiccant at least partially impregnated with a fat soluble antioxidant, said desiccant possessing a greater affinity for water than for said antioxidant, said composition being in a packetized form which inhibits dispersal of solid component portions of said composition at least partially throughout said product, whereby when said solid composition in said packetized form is placed within the container along with the stored product, a quantity of said fat soluble antioxidant is released into the confined atmosphere as any moisture present within the container is absorbed by said composition.

21. A method for enhancing preservation of a product stored in a confined atmosphere within a container, comprising the steps of:

preparing a composition comprising a desiccant impregnated with a fat soluble antioxidant, said desiccant possessing a greater affinity for water than for said antioxidant; and disposing said composition in a packetized form within the container, whereby a quantity of said fat soluble antioxidant is released into the confined atmosphere as any moisture present therewithin is absorbed by said composition.

22. The packetized antioxidant according to claim 1, wherein the quantity of fat soluble antioxidant released is proportional to the amount of moisture absorbed by the composition.

23. The packetized antioxidant according to claim 10, wherein the quantity of fat soluble antioxidant released is proportional to the amount of moisture absorbed by the composition.

24. The antioxidant/desiccant combination according to claim 11, wherein the quantity of fat soluble antioxidant released is proportional to the amount of moisture absorbed by the composition.

25. The antioxidant/desiccant combination according to claim 20, wherein the quantity of fat soluble antioxidant released is proportional to the amount of moisture absorbed by the composition.

26. The method according to claim 21, wherein the quantity of fat soluble antioxidant released is proportional to the amount of moisture absorbed by the composition.

* * * * *